United States Patent
Ikeda et al.

(10) Patent No.: US 7,517,931 B2
(45) Date of Patent: Apr. 14, 2009

(54) METHOD FOR MANUFACTURING RUBBER PRODUCT

(75) Inventors: Hidehito Ikeda, Kasugai (JP); Yoshio Okado, Kasugai (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 407 days.

(21) Appl. No.: 11/259,055

(22) Filed: Oct. 27, 2005

(65) Prior Publication Data

US 2006/0094814 A1  May 4, 2006

(30) Foreign Application Priority Data

Oct. 28, 2004  (JP) .............................. 2004-314427

(51) Int. Cl.
*C08K 3/04* (2006.01)

(52) U.S. Cl. ...................................... 524/494; 524/495

(58) Field of Classification Search ................. 524/495, 524/496

See application file for complete search history.

(56) References Cited

U.S. PATENT DOCUMENTS 6,942,590 B2 *  9/2005  Okuno et al. ............... 474/242

FOREIGN PATENT DOCUMENTS

| JP | 10-180941 | 7/1998 |
|----|-----------|--------|
| JP | 2000-273241 | 10/2000 |
| JP | 2003-80583 | 3/2003 |

* cited by examiner

*Primary Examiner*—Robert D. Harlan
(74) *Attorney, Agent, or Firm*—Westerman, Hattori, Daniels & Adrian, LLP.

(57) ABSTRACT

A method for manufacturing a high-quality rubber product while preventing carbon black from separating from the rubber polymer and from reaggregating, without deteriorating the work environment, and the rubber product obtained by the method. The method for manufacturing a rubber product comprising preparing a rubber composition containing carbon black mixed in rubber by a rubber kneading procedure including a mastication process and a kneading process; and vulcanizing and molding the rubber composition to manufacture a rubber product, wherein, together with the carbon black, a monofunctional acrylic monomer is mixed in the rubber in the mastication process.

4 Claims, No Drawings

METHOD FOR MANUFACTURING RUBBER PRODUCT

BACKGROUND OF THE INVENTION

1. Field of the Invention

The present invention relates to a method for manufacturing a rubber product and the rubber product obtained by same method.

2. Description of the Art

Conventionally, automotive radiator hoses and other rubber products have been made from a rubber composition containing rubber, such as an ethylene-propylene-diene terpolymer (EPDM), a reinforcing agent, such as carbon black, a vulcanizing agent, such as sulfur, and a plasticizer, such as oil. The rubber composition is typically prepared through a mastication process and a kneading process. In the mastication process, the rubber is plasticized by the application of mechanical shearing force to disentangle aggregated molecules or the cleavage of molecular chains. The plasticized rubber is mixed with carbon black, sulfur, oil, and other materials in the kneading process. For further details, see Japanese Unexamined Patent Publication No. 10-180941 and "Gomu no Jiten" (an encyclopedia of rubber), edited by Michio Okuyama et al., Asakura-shoten, Tokyo (2000), p. 303.

However, low-polarity rubber (rubber having few polar groups), such as EPDM, has a low affinity for carbon black. Thus, it is difficult to disperse the carbon black uniformly in the rubber polymer. Furthermore, when high-polarity carbon black is used to increase the reinforcing property (strength) of a rubber product, the affinity between the low-polarity rubber and the carbon black further decreases.

To achieve sufficient mixing in the above-mentioned preparation, various procedures, including a masterbatch method, have been proposed. However, even using these mixing procedures, carbon black may separate from the rubber polymer and reaggregate over time. In particular, the high-polarity carbon black or carbon black having a minute particle diameter (minuter than FEF (Fast Extruding Furnace) carbon black), tends to separate from the rubber polymer and may reaggregate. The reaggregation results in surface roughness of a final rubber product, and also leads to reduction or variation in the electrical resistance of the rubber product.

On the other hand, the addition of a silane coupling agent, sulfur or a sulfur-based vulcanization accelerator, and/or a phenol-based stabilizer to the rubber composition in preparation thereof is proposed to prevent the separation between the carbon black and the rubber polymer and the reaggregation of the carbon black. However, the silane coupling agent is expensive and increases the production cost, which cannot satisfy the demand for lowering cost of a rubber product. In addition, since unpleasant odor of the silane coupling agent deteriorates the work environment, there is a need for nonuse of the silane coupling agent. The silane coupling agent may also deteriorate the moldability of extrusion molding (or increase the surface roughness of an extrudate). For sulfur or the sulfur-based vulcanization accelerator, temperature control in kneading is required (temperature control of 150° C. or lower). Especially, where general-purpose compounds are subjected to short-time mixing, they are often kneaded at temperatures higher than 150° C. In such a case, sulfur or the sulfur-based vulcanization accelerator tends to have little dispersion effect on the carbon black. While the phenol-based stabilizer, such as those manufactured by Sumitomo Chemical Co. Ltd. under the trade name of SUMILIZER GM or SUMILIZER GS, is suitably used owing to its excellent dispersion effect on the carbon black, it is very expensive and is not-suitable for general use.

SUMMARY OF THE INVENTION

Accordingly, it is an object of the present invention to provide a method for manufacturing a high-quality rubber product while preventing carbon black from separating from the rubber polymer and from reaggregating, without deteriorating the work environment.

It is another object of the present invention to provide a high-quality rubber product manufactured by the present method.

To this end, according to a first aspect of the present invention, a method for manufacturing a rubber product, comprises: preparing a rubber composition containing carbon black mixed in rubber by a rubber kneading procedure including a mastication process and a kneading process; and vulcanizing and molding the rubber composition to manufacture a rubber product, wherein, together with the carbon black, a monofunctional acrylic monomer is mixed in the rubber in the mastication process.

According to a second aspect of the present invention, a rubber product is manufactured by the method.

To solve the problems described above, the present inventors reviewed conventional procedures for preparing a rubber composition as a raw material for a rubber product. That is, as described above, the conventional procedures involve the mastication process in which the rubber is plasticized by the application of mechanical shearing force to disentangle aggregated molecules or the cleavage of molecular chains and the kneading process in which the plasticized rubber is mixed with carbon black, sulfur, oil, and other materials. Conventionally, almost no materials other than the rubber are added in the mastication process. This is partly because the mastication process is usually performed at a high temperature. That is, for example, when sulfur is added in the mastication process, vulcanization will start immediately, resulting in scorching during the subsequent processes, such as extrusion molding. Another reason is that carbon black and other materials can be easily dispersed in the rubber after the rubber has been disentangled by means of the mastication process.

However, once the separation between the carbon black and the rubber polymer and the reaggregation of the carbon black occur, the conventional procedures can hardly prevent them. Without being bound by a particular theory, the present inventors have piled up studies from a new point of view. As a result, the present inventors had the idea of adding carbon black with a monofunctional acrylic monomer in the mastication process, instead of addition thereof in the kneading process as in the conventional methods. The present inventors found that the addition of carbon black together with the monofunctional acrylic monomer in the mastication process allows uniform dispersion of the carbon black and prevents the carbon black from separating from the rubber polymer and reaggregating over time. Thus, the present invention has been attained. The reason for this is not obvious but is thought to be as follows. It is thought that since the monofunctional acrylic monomer has low molecular weight and most thereof are liquid, the monofunctional acrylic monomer increases compatibility between the rubber and the carbon black, and acrylic unsaturated bond in the monofunctional acrylic monomer traps a free radical generated by the shearing force during compounding and extrusion, so that the separation between the carbon black and the rubber polymer and the reaggregation of the carbon black tend not to occur.

For example, where EPDM is used as the rubber, a free radical is generated by the shearing force during compounding and extrusion in a diene component of crosslinking position, which further generates linkage of diene components or linkage between the diene component and a functional group on a surface of the carbon, which may cause gelation. However, when the monofunctional acrylic monomer is mixed in the rubber in the mastication process, these problems can also be solved.

As described above, in the present invention, the monofunctional acrylic monomer, together with carbon black, is mixed in the mastication process for preparing a rubber composition as a raw material. This allows uniform dispersion of the carbon black in the rubber polymer and prevents the carbon black from separating from the rubber polymer and reaggregating over time. Thus, high-quality rubber products can be manufactured. The present method does not necessarily require a silane coupling agent to prevent the carbon black from separating from the rubber polymer and reaggregating, and thereby provides an excellent work environment.

In particular, in the mastication process, when the content of the monofunctional acrylic monomer is 0.2 to 10 parts by weight based on 100 parts by weight of the rubber, the carbon black can be efficiently dispersed without adversely affecting the physical properties of the rubber product.

Further, when the rubber is a low-polarity rubber, such as ethylene-propylene-diene rubber, butyl rubber, natural rubber, isoprene rubber, ethylene-propylene rubber, and/or silicone rubber, conventionally, the use of these rubbers often causes the separation between the carbon black and the rubber polymer and the reaggregation of the carbon black. However, the present invention overcomes these problems and is thus highly useful.

The rubber product manufactured by such a method does not exhibit a rough surface due to coagula of the carbon black and has a uniform electrical resistance and high quality.

DESCRIPTION OF THE PREFERRED EMBODIMENTS

The present invention will be described in detail below.

As described above, the method for manufacturing a rubber product according to the present invention involves preparing a rubber composition containing carbon black mixed in rubber by a rubber kneading procedure including a mastication process and a kneading process and vulcanizing and molding the rubber composition to manufacture a rubber product, wherein, together with the carbon black, a monofunctional acrylic monomer is mixed in the rubber in the mastication process.

Examples of the rubber include, but are not limited to, chloroprene rubber (CR), acrylonitrile-butadiene rubber (NBR), a blend rubber (NBR-PVC) of NBR and polyvinyl chloride (PVC), hydrogenated NBR (H-NBR), acrylic rubber (ACM), ethylene-acrylic rubber (AEM), epichlrohydrin rubber (ECO), chlorosulfonated polyethylene (CSM), chlorinated polyethylene rubber (CPE), ethylene-propylene-diene rubber (EPDM), butyl rubber (IIR), natural rubber (NR), isoprene rubber (IR), ethylene-propylene rubber (EPM), and silicone rubber (Q). These rubbers are used alone or in combination. Among them, a low-polarity rubber, such as ethylene-propylene-diene rubber (EPDM), butyl rubber (IIR), natural rubber (NR), isoprene rubber (IR), ethylene-propylene rubber (EPM), or silicone rubber (Q), has less affinity for the carbon black. Thus, essentially, it is difficult to disperse the carbon black uniformly in the low-polarity rubber polymer. However, such a problem is overcome by the present invention.

Examples of the carbon black include, but are not limited to, Ketjen black, acetylene black, furnace black, channel black, thermal black, and color black. These are used alone or in combination. Among others, high-polarity carbon black is preferred because it increases the reinforcing property (strength) of the resulting rubber product. Although, conventionally, the use of the high-polarity carbon black often causes the separation between the carbon black and the rubber polymer and the reaggregation of the carbon black, these problems are overcome by the present invention. Thus, the use of the high-polarity carbon black in the present invention is of further importance and increases utility in this technical field. In particular, a combination of high-polarity carbon black and low-polarity rubber usually produces significant aggregation. However, the present invention overcomes this problem and is therefore particularly useful for this combination. The high-polarity carbon black is a carbon black having a polar group, such as a hydroxyl group or a carboxyl group, on part of the surface, and is intrinsically liable to aggregate. As the high-polarity carbon black, specifically, a carbon black manufactured by Showa Cabot K.K. under the trade name of SHOWBLACK IP200 is preferred.

In the present invention, where the carbon black is minuter than FEF (Fast Extruding Furnace), i.e., hard carbon such as XCF (Extra Conductive Furnace), HAF (High Abrasion Furnace), ISAF (Intermediate Super Abrasion Furnace) and SAF (Super Abrasion Furnace), the separation between the carbon black and the rubber polymer and the reaggregation, which are conventionally occurred, can be prevented. For this reason, such hard carbon may be used in the present invention. The addition of such hard carbon improves physical properties before vulcanization and ensures abrasion resistance and reinforcing property. As the hard carbon, those having an iodine adsorption amount of 30 to 120 mg/g are generally to be used. Those having an iodine adsorption amount of 30 to 100 mg/g are preferred.

The content of the carbon black is preferably 50 to 150 parts by weight (hereinafter just abbreviated to "parts") and more preferably 70 to 130 parts based on 100 parts of the rubber. Less than 50 parts of the carbon black may be insufficient to impart reinforcing property of satisfying the function of the final rubber product. By contrast, more than 150 parts of the carbon black may adversely affect the physical properties, such as flexibility, of the rubber product.

Examples of the monofunctional acrylic monomer mixed in the rubber together with the carbon black include, but are not limited to, monofunctional acrylate and monofunctional methacrylate. These are used alone or in combination.

Examples of the monofunctional acrylate include, but are not limited to, phenol EO(Ethylene Oxide)-modified (2 mols) acrylate, phenol EO-modified (4 mols) acrylate, p-cumyl phenol EO-modified (1 mol) acrylate, nonylphenol EO-modified (1 mol) acrylate, nonylphenol EO-modified (4 mols) acrylate, nonylphenol PO(Propylene Oxide)-modified (2.5 mols) acrylate, 2-ethylhexyl carbitol acrylate, N-vinyl-2-pyrrolidone (N-VP), isobornyl acrylate (IBXA), cyclohexyl acrylate, lauryl acrylate, synthetic lauryl acrylate ($C_{12-13}$), alkyl ($C_{16-18}$) acrylate, stearyl acrylate, behenyl acrylate, branched alkyl ($C_{18}$) acrylate, polyethylene glycol monoacrylate, polypropylene glycol monoacrylate, polyethylene glycol-propylene glycol monoacrylate, poly(ethylene glycol-tetramethylene glycol) monoacrylate, poly(propylene glycol-tetramethylene glycol) monoacrylate, propylene glycol polybutylene glycol monoacrylate, methoxypolyethylene glycol monoacrylate, methoxydiethylene glycol monoacrylate, ethoxydiethylene glycol monoacrylate, octoxypolyethylene glycol polypropylene glycol monoacrylate, lauroxy polyethylene glycol monoacrylate, stearoxy polyethylene glycol-polypropylene glycol monoacrylate, allyloxy polyethylene glycol-polypropylene glycol monoacrylate, nonylphenoxy polyethylene glycol monoacrylate, nonylphenoxy polypropylene glycol monoacrylate, nonylphenoxy poly(ethylene glycol-propylene glycol) monoacrylate, phenoxy poly(ethylene glycol) monoacrylate, 2-hydroxyethyl acrylate, 2-hydroxypropyl acrylate, isoamyl acrylate, isomyristyl acrylate, butoxyethyl acrylate, methoxy-triethylene glycol acrylate, 2-ethylhexyl-diglycol acrylate, methoxy dipropylene glycol acrylate, phenoxy ethyl acrylate and tetrahydrofurfuryl acrylate. These are used alone or in combination.

Examples of the monofunctional methacrylate include, but are not limited to, n-butyl methacrylate, isobutyl methacrylate, cyclohexyl methacrylate, 2-ethylhexyl methacrylate, tert-butyl cyclohexyl methacrylate, lauryl methacrylate, synthetic lauryl methacrylate ($C_{12-13}$), alkyl ($C_{14-18}$) methacrylate, stearyl methacrylate, behenyl methacrylate, $C_{18-24}$ alkyl methacrylate, branched alkyl ($C_{12}$) methacrylate, 2-hydroxyethyl methacrylate, polyethylene glycol monomethacrylate, hydroxypropyl methacrylate, polypropylene glycol monomethacrylate, poly(ethylene glycol-propylene glycol) monomethacrylate, polyethylene glycol-propylene glycol monomethacrylate, poly(ethylene glycol-tetramethylene glycol) monomethacrylate, poly(propylene glycol-tetramethylene glycol) monomethacrylate, propylene glycol polybutylene glycol monomethacrylate, methoxypolyethylene glycol monomethacrylate, octoxypolyethylene glycol polypropylene glycol monomethacrylate, lauroxy polyethylene glycol monomethacrylate, stearoxy polyethylene glycol monomethacrylate, allyloxy polyethylene glycol-polypropylene glycol monomethacrylate, isodecyl methacrylate, methyl methacrylate, ethyl methacrylate, alkyl ($C_{12-15}$) methacrylate, n-butoxyethyl methacrylate, butoxydiethylene glycol methacrylate, methoxytriethylene glycol methacrylate, methoxypolyethylene glycol methacrylate, tetrahydrofurfuryl methacrylate, benzyl methacrylate, phenoxyethyl methacrylate, isobornyl methacrylate, 2-hydroxybutyl methacrylate, dimethylaminoethyl methacrylate, diethylaninoethyl methacrylate, quaternary dimethylaminoethyl methacrylate, quaternary dimethylaminoethyl methacrylate aqueous solution and glycidyl methacrylate. These are used alone or in combination.

Among the above-mentioned monofunctional acrylic monomers, isodecyl methacrylate, lauryl methacrylate and tert-butyl cyclohexyl methacrylate are preferred because they do not smell so much and each molecular weight thereof is small so that they can result in a good mixing effect with less addition.

Where a bifunctional or trifunctional acrylic monomer is used instead of the above-mentioned monofunctional acrylic monomer in the mastication process, crosslinking proceeds partially at the same time as it is added, and then gelation or scorching may occur, which cannot result in good mixing effect aimed by the present invention.

The content of the monofunctional acrylic monomer is preferably 0.2 to 10 parts and more preferably 0.5 to 5 parts based on 100 parts of the rubber. Less than 0.2 parts of the monofunctional acrylic monomer may be insufficient to achieve satisfactory level of dispersion of the carbon black. By contrast, more than 10 parts of the monofunctional acrylic monomer may decrease cost effectiveness and slightly lowers viscosity of the compound, resulting in fear of permanent set in extrusion, and further may tend to slightly deteriorate compression set and the like.

As described above, the mastication process of the rubber kneading procedure is conducted by using these materials. Typically, they are mixed by means of an internal mixer, such as a BANBURY mixer, in the mastication process. For example, where they are mixed with a BANBURY mixer in the mastication process, the time for the mastication is 5 to 10 minutes, and the typical temperature is 110° C. to 190° C.

In addition to the materials described above, a softener, an antioxidant, a processing aid, a filler (for example, a white filler), and other additives may be added in the mastication process unless they adversely affect the physical properties of the rubber product. However, these additives may be added in the kneading process.

The mastication process is followed by the kneading process by means of an open-roll mill or the like. In the kneading process, a vulcanizing agent, such as sulfur, may be mixed. A vulcanization accelerator and the like are added, as required. Further, as described above, a softener, an antioxidant, a processing aid, a filler and other additives may also be added, as required For example, where they are mixed by an open-roll mill in the kneading process, the time for the kneading is 2 to 5 minutes and the typical temperature is 50° C. to 80° C.

Sulfur is preferred as the vulcanizing agent. The content of the sulfur is preferably 0.3 to 10 parts and more preferably 0.5 to 5 parts based on 100 parts of the rubber.

Examples of the vulcanization accelerator include, but are not limited to, thiazole-based accelerators, such as 2-mercaptobenzothiazole (MBT), thiuram-based accelerators, such as tetramethylthiurammonosulfide (TMTM), sulfenamide-based accelerators, such as N-cyclohexyl-2-benzothiazyl-sulfenamide (CBS), and dibenzothiazyldisulfide (MBTS).

The content of the vulcanization accelerator is preferably 0.1 to 7 parts and more preferably 0.5 to 4 parts based on 100 parts of the rubber.

In the rubber composition thus prepared, the carbon black rarely separates from the rubber polymer and hardly reaggregates. This can be confirmed by determining variations in the Mooney viscosity of the rubber composition over time. The Mooney viscosity can be measured by a MOONEY viscometer (for example, manufactured by Toyo Seiki Seisaku-Sho, Ltd.). The separation between the carbon black and the rubber polymer or the reaggregation of the carbon black will increase the Mooney viscosity over time. In the rubber composition prepared by the method according to the present invention, little variations in the Mooney viscosity are observed.

The rubber composition thus prepared may be vulcanized and molded into a rubber product of any shape. Examples of the molding include, but are not limited to, extrusion molding, injection molding, and press forming. The conditions of the vulcanization and molding are not limited and depend on the size of the rubber product to be manufactured, the type of the rubber, and other factors.

The application of the thus obtained rubber product is not specifically limited, as long as it requires reinforcement and high electrical conductivity obtained by the dispersion of the carbon black: for example, an automotive radiator hose and an electrically conductive roll for an electrophotographic copier. According to the method of the present invention, coagula of the carbon black are reduced and thereby the rubber product has improved surface quality of the extrudate, which is remarkable improvement as compared with the conventional method.

The method and the product of the present invention will be more fully understood from the following Examples along with Comparative Examples.

The materials under the following trade names were prepared.

EPDM: Esprene 552, Sumitomo Chemical Co. Ltd.

Zinc oxide; Two kinds of zinc oxide from Mitsui Mining And Smelting Company Co. Ltd.

Stearic acid: LUNAC S30, Kao Corporation

Carbon black (i): SHOWBLACK IP200, Showa Cabot K.K.

Carbon black (ii): SEAST SO, Tokai Carbon Co., Ltd.

Carbon black (iii): SHOWBLACK N330, Showa Cabot K.K.

Filler: DIXIE CLAY, R.T.Vanderbilt Company, Inc.

Oil: Diana Process Oil PW-380, Idemitsu Kosan Co. Ltd.

Monofunctional acrylic monomer (i): LIGHT-ESTER ID, KYOEISHA CHEMICAL Co., LTD.

Monofunctional acrylic monomer (ii): ACRYLIC ESTER L, MITSUBISHI RAYON CO., LTD.

Monofunctional acrylic monomer (iii): ACRYLIC ESTER TBX, MITSUBISHI RAYON CO., LTD.

Monofunctional acrylic monomer (iv): BLEMMER FE-200, NOF CORPORATION

Monofunctional acrylic monomer (v): BLEMMER LA, NOF CORPORATION

Monofunctional acrylic monomer (vi): ARONIX M-102, TOAGOSEI CO., LTD.

Monofunctional acrylic monomer (vii): ARONIX M-113, TOAGOSEI CO., LTD.

Bifunctional methacrylate: ACRYLIC ESTER ED, MITSUBISHI RAYON CO., LTD.

Trifunctional methacrylate: ACRYLIC ESTER TMP, MITSUBISHI RAYON CO., LTD.

Vulcanization accelerator: SANCELER TT, TET, CZ and BZ (four-accelerator mixture, mixture ratio of 1:1:1:1) Sanshin Chemical Industry Co. Ltd.

Sulfur: SULFUR-FTC, Daito Sangyo Co. Ltd.

EXAMPLES 1 TO 15 AND COMPARATIVE EXAMPLES 1 TO 3

Each compound shown in Tables 1 and 2 other than the vulcanization accelerator and the sulfur was masticated with a BANBURY mixer for 5 minutes to a final temperature of 180° C. Then, the mixture was transferred to an open-roll mill. After the vulcanization accelerator and the sulfur were added, the mixture was kneaded for 2 minutes. The resulting rubber composition was press-formed at 150° C. for 30 minutes into a sheet having a thickness of 2 mm (specimen). The rubber composition was also extruded and was cured by steam vulcanization at 150° C. for 30 minutes to produce a hose (specimen).

TABLE 1

| | | | | | Examples | | | | | (parts) |
|---|---|---|---|---|---|---|---|---|---|---|
| | 1 | 2 | 3 | 4 | 5 | 6 | 7 | 8 | 9 |
| EPDM | 100 | 100 | 100 | 100 | 100 | 100 | 100 | 100 | 100 |
| Zinc oxide | 5 | 5 | 5 | 5 | 5 | 5 | 5 | 5 | 5 |
| Stearic acid | 1 | 1 | 1 | 1 | 1 | 1 | 1 | 1 | 1 |
| Carbon black (i) | 120 | 120 | 120 | 120 | 120 | 120 | 120 | 120 | 120 |
| Carbon black (ii) | — | — | — | — | — | — | — | — | — |
| Carbon black (iii) | — | — | — | — | — | — | — | — | — |
| Filler | 60 | 60 | 60 | 60 | 60 | 60 | 60 | 60 | 60 |
| Oil | 60 | 60 | 60 | 60 | 60 | 60 | 60 | 60 | 60 |
| Monofunctional acrylic monomer (i) | 0.5 | 5 | 2.5 | — | — | — | — | — | — |
| Monofunctional acrylic monomer (ii) | — | — | — | 2.5 | — | — | — | — | — |
| Monofunctional acrylic monomer (iii) | — | — | — | — | 2.5 | — | — | — | — |
| Monofunctional acrylic monomer (iv) | — | — | — | — | — | 2.5 | — | — | — |
| Monofunctional acrylic monomer (v) | — | — | — | — | — | — | 2.5 | — | — |
| Monofunctional acrylic monomer (vi) | — | — | — | — | — | — | — | 2.5 | — |
| Monofunctional acrylic monomer (vii) | — | — | — | — | — | — | — | — | 2.5 |
| Bifunctional methacrylate | — | — | — | — | — | — | — | — | — |
| Trifunctional methacrylate | — | — | — | — | — | — | — | — | — |
| Vulcanization accelerator | 4 | 4 | 4 | 4 | 4 | 4 | 4 | 4 | 4 |
| Sulfur | 1 | 1 | 1 | 1 | 1 | 1 | 1 | 1 | 1 |

TABLE 2

(parts)

|  | Examples | | | | | | Comparative Examples | | |
|---|---|---|---|---|---|---|---|---|---|
|  | 10 | 11 | 12 | 13 | 14 | 15 | 1 | 2 | 3 |
| EPDM | 100 | 100 | 100 | 100 | 100 | 100 | 100 | 100 | 100 |
| Zinc oxide | 5 | 5 | 5 | 5 | 5 | 5 | 5 | 5 | 5 |
| Stearic acid | 1 | 1 | 1 | 1 | 1 | 1 | 1 | 1 | 1 |
| Carbon black (i) | 120 | 120 | — | — | 120 | 120 | 120 | 120 | 120 |
| Carbon black (ii) | — | — | 120 | — | — | — | — | — | — |
| Carbon black (iii) | — | — | — | 120 | — | — | — | — | — |
| Filler | 60 | 60 | 60 | 60 | 60 | 60 | 60 | 60 | 60 |
| Oil | 60 | 60 | 60 | 60 | 60 | 60 | 60 | 60 | 60 |
| Monofunctional acrylic monomer (i) | 0.2 | 10 | 2.5 | 2.5 | 0.15 | 12 | — | — | — |
| Monofunctional acrylic monomer (ii) | — | — | — | — | — | — | — | — | — |
| Monofunctional acrylic monomer (iii) | — | — | — | — | — | — | — | — | — |
| Monofunctional acrylic monomer (iv) | — | — | — | — | — | — | — | — | — |
| Monofunctional acrylic monomer (v) | — | — | — | — | — | — | — | — | — |
| Monofunctional acrylic monomer (vi) | — | — | — | — | — | — | — | — | — |
| Monofunctional acrylic monomer (vii) | — | — | — | — | — | — | — | — | — |
| Bifunctional methacrylate | — | — | — | — | — | — | — | 2.5 | — |
| Trifunctional methacrylate | — | — | — | — | — | — | — | — | 2.5 |
| Vulcanization accelerator | 4 | 4 | 4 | 4 | 4 | 4 | 4 | 4 | 4 |
| Sulfur | 1 | 1 | 1 | 1 | 1 | 1 | 1 | 1 | 1 |

Properties of the sheets and the hoses of Examples and Comparative Examples were evaluated according to the following criteria, and the results are shown in Tables 3 and 4.

Physical Properties Before Vulcanization

Before the vulcanization, the viscosity of the rubber composition was measured with a MOONEY viscometer (Toyo Seiki Seisaku-Sho, Ltd.) at 100° C. at 20 and 60 minutes after the preparation. Maximum errors $\Delta M_1$ [$ML_{1+4}$ 100° C., 20 min] and $\Delta M_2$ [$ML_{1+4}$ 100° C., 60 min] were calculated based on the Mooney viscosities [$ML_{1+4}$ 100° C.].

Volume Resistivity

The volume resistivity ρv (Ω·cm) of the sheet (specimen) was measured at 25° C. and 64% RH according to JIS K 6911.

Surface Roughness of Extrudate

The surface roughness of the hose (specimen) obtained by extrusion was visually evaluated and was rated as good (○), fair (Δ), or poor (x), in which smoothness, without surface projection, was decreased in this order.

Tube Form Maintenance in Extrusion

The tube form maintenance of the specimen (hose) obtained by extrusion was visually evaluated and was rated as good (○), fair (Δ), or poor (x), in which molding accuracy, without permanent set (collapsed hollow tubular structure), was decreased in this order.

Compression Set

The compression set of the sheet (specimen) was measured under conditions of a temperature of 120° C., test time of 22 hours and a compression ratio of 25%, according to JIS K 6262.

TABLE 3

|  | Examples | | | | | | | | |
|---|---|---|---|---|---|---|---|---|---|
|  | 1 | 2 | 3 | 4 | 5 | 6 | 7 | 8 | 9 |
| $\Delta M_1$ [$ML_{1+4}$ 100° C., 20 min] | 5.8 | 0.2 | 2.1 | 2.8 | 4.2 | 4.5 | 6.2 | 5.2 | 5.8 |
| $\Delta M_2$ [$ML_{1+4}$ 100° C., 60 min] | 12.2 | -2.4 | 1.2 | 3.0 | 6.7 | 7.7 | 8.0 | 2.5 | 4.5 |
| Volume resistivity ρv (Ω · cm) | $2.8 \times 10^6$ | $5.8 \times 10^7$ | $5.4 \times 10^6$ | $6.5 \times 10^6$ | $4.9 \times 10^6$ | $7.5 \times 10^6$ | $7.0 \times 10^6$ | $4.5 \times 10^6$ | $6.4 \times 10^6$ |

TABLE 3-continued

| | Examples | | | | | | | | |
|---|---|---|---|---|---|---|---|---|---|
| | 1 | 2 | 3 | 4 | 5 | 6 | 7 | 8 | 9 |
| Surface roughness of extrudate | ○ | ○ | ○ | ○ | ○ | ○ | ○ | ○ | ○ |
| Tube form maintenance in extrusion | ○ | ○ | ○ | ○ | ○ | ○ | ○ | ○ | ○ |
| Compression set (%) | 49 | 52 | 48 | 50 | 49 | 50 | 50 | 48 | 50 |

TABLE 4

| | Examples | | | | | | Comparative Examples | | |
|---|---|---|---|---|---|---|---|---|---|
| | 10 | 11 | 12 | 13 | 14 | 15 | 1 | 2 | 3 |
| $\Delta M_1$ [$ML_{1+4}$ 100° C., 20 min] | 9.2 | 0.7 | 6.8 | 8.6 | 13.5 | 1.0 | 18.5 | ≧30* | ≧30* |
| $\Delta M_2$ [$ML_{1+4}$ 100° C., 60 min] | 14.2 | −4.3 | 7.9 | 10.8 | 22.8 | −3.5 | ≧30* | — | — |
| Volume resistivity $\rho v$ ($\Omega \cdot cm$) | $1.1 \times 10^6$ | $1.5 \times 10^8$ | $8.6 \times 10^3$ | $1.0 \times 10^3$ | $8.2 \times 10^5$ | $1.8 \times 10^8$ | $4.8 \times 10^5$ | $6.6 \times 10^5$ | $5.4 \times 10^5$ |
| Surface roughness of extrudate | ○ | ○ | ○ | ○ | Δ | ○ | X | X | X |
| Tube form maintenance in extrusion | ○ | Δ | ○ | ○ | ○ | Δ | ○ | ○ | X |
| Compression set (%) | 52 | 57 | 58 | 59 | 54 | 61 | 55 | 58 | 58 |

*The value exceeded the limit of measurement.

The results show that, the hoses of Examples had no surface abnormality and the Mooney viscosities of the rubber compositions exhibited little variations in physical properties before vulcanization. Thus, the separation between the carbon black and the rubber polymer and the reaggregation of the carbon black were prevented. The sheets of Examples had higher electrical resistances than Comparative Examples at the same carbon content. This demonstrates improved dispersion of the carbon black of Examples according to the present invention. The improved dispersion of the carbon black was also confirmed for other rubber, such as IIR, NR, IR, EPM, and Q, instead of EPDM (not shown).

By contrast, in Comparative Examples, the Mooney viscosities varied greatly over time, and inferior surface qualities and reduced electrical resistances owing to the aggregation of the carbon black were observed. Particularly in Comparative Examples 2 and 3, wherein bifunctional or trifunctional acrylic monomer was used in the mastication process, crosslinking proceeds partially at the same time as it was added, and then gelation or scorching occurred.

What is claimed is:

1. A method for manufacturing a rubber product, comprising the steps of:

preparing a rubber composition containing carbon black mixed in rubber by a mastication process for masticating the rubber composition followed by a kneading process for kneading the rubber composition; and vulcanizing and molding the rubber composition to manufacture a rubber product, wherein, together with the carbon black, a monofunctional acrylic monomer is mixed in the rubber in the mastication process.

2. The method for manufacturing a rubber product according to claim 1, wherein the content of the monofunctional acrylic monomer is from 0.2 to 10 parts by weight per 100 parts by weight of the rubber in the mastication process.

3. The method for manufacturing a rubber product according to claim 1, wherein the rubber is at least one low-polarity rubber selected from the group consisting of ethylene-propylene-diene rubber, butyl rubber, natural rubber, isoprene rubber, ethylene-propylene rubber, and silicone rubber.

4. The method for manufacturing a rubber product according to claim 2, wherein the rubber is at least one low-polarity rubber selected from the group consisting of ethylene-propylene-diene rubber, butyl rubber, natural rubber, isoprene rubber, ethylene-propylene rubber, and silicone rubber.

* * * * *